United States Patent [19]
Sarraf

[11] Patent Number: 5,517,231
[45] Date of Patent: May 14, 1996

[54] APPARATUS AND METHOD FOR INCREASING THE PRODUCTIVITY OF A THERMAL PRINTING APPARATUS FOR THE PRODUCTION OF FINELY DETAILED IMAGES OF PHOTOGRAPHIC QUALITY

[75] Inventor: Sanwal P. Sarraf, Webster, N.Y.

[73] Assignee: Eastman Kodak Company, Rochester, N.Y.

[21] Appl. No.: 129,892

[22] Filed: Sep. 30, 1993

[51] Int. Cl.$^6$ .................................................. H04N 1/21
[52] U.S. Cl. .................................. 347/252; 347/131
[58] Field of Search .................................... 347/131, 252, 347/251, 253, 240; 358/298

[56] References Cited

U.S. PATENT DOCUMENTS

| | | | |
|---|---|---|---|
| 3,229,033 | 1/1966 | Artzt | 178/6 |
| 3,751,587 | 8/1973 | Insler et al. | 178/6.6 |
| 4,390,882 | 6/1983 | Ohara et al. | 346/1.1 |
| 4,447,830 | 5/1984 | Stoffel | 358/283 |
| 4,713,699 | 12/1987 | Nakamura et al. | 358/296 |
| 4,833,124 | 5/1989 | Lum | 503/227 |
| 4,969,047 | 11/1990 | Sasaki et al. | 358/296 |
| 5,047,871 | 9/1991 | Meyer et al. | 358/486 |
| 5,053,619 | 10/1991 | Arimoto | 250/235 |
| 5,109,283 | 4/1992 | Carley | 358/298 |
| 5,241,328 | 8/1993 | Sarraf et al. | 347/252 |
| 5,258,780 | 11/1993 | Ema et al. | 347/252 |

*Primary Examiner*—Mark J. Reinhart
*Attorney, Agent, or Firm*—Nelson A. Blish

[57] ABSTRACT

Apparatus and method for digitally printing a finely detailed image using pulse width modulation (PWM) with improved productivity over the prior art. Many images, or portions of images, generated by printers utilizing PWM do not require that any of the pixels be exposed for the maximum time possible, but that a maximum exposure can be determined for a selected portion of the image, whether it is for a line, for a paragraph, or for a selected color, that can then be used to speed up the printing of that portion of the image. Thus, a less than full density exposure can be set as the maximum, and the scanning speed increased accordingly to shorten the overall time required for printing that portion of the image.

8 Claims, 4 Drawing Sheets

APPARATUS AND METHOD FOR INCREASING THE PRODUCTIVITY OF A THERMAL PRINTING APPARATUS FOR THE PRODUCTION OF FINELY DETAILED IMAGES OF PHOTOGRAPHIC QUALITY

FIELD OF THE INVENTION

The present invention relates to an apparatus and a method for digitally printing a finely detailed image, such as a full color photograph or slide transparency, which has improved productivity over the prior art.

BACKGROUND OF THE INVENTION

In my U.S. Pat. No. 5,241,328, a digital printing system is described which uses the heat energy of a laser beam to print a finely detailed image onto a receiver element, which, for example, is a slide transparency. The apparatus and method described therein provides improved linearity in tone scale compared to previous images of that kind. The printed image, which should be as faithful as possible to an original or master image, is printed as a series of dots or pixels by scanning the laser beam a line at a time across a dye donor element held by vacuum against a blank slide transparency or receiver element. The laser beam is rapidly modulated in intensity by input data corresponding to the master image and "spots" or pixels of dye, corresponding to the pixels of the master image, are transferred by thermal energy from the dye donor element onto the slide transparency or receiver. To obtain sufficiently high resolution, such as needed in photographic prints or slide transparencies, to give a desired degree of sharpness in the image (e.g., at 100 power magnification for slides), the dye pixels are very small, e.g., only about 7 microns, and are written at a very close pitch, for example, about 4,000 pixels per inch. They are written at a high speed (e.g., 140 KHZ) since otherwise the printing of the entire image would take an inordinately long time.

As disclosed in the above-referenced application, for a thermally printed reproduction of a master image to be suitable for viewing at projection magnifications of up to 100X, it is necessary that the individual pixels of the printed image be very small and very accurately positioned. It is also highly desirable that the individual pixels each have a density or tone value corresponding as closely as possible to the respective densities of the pixels of the master image. It is also necessary, as noted above, that the speed of producing the image be maximized to reduce the time necessary for the production of each image.

As also disclosed in the above-identified application, the apparatus provided comprises a laser and an electronic laser drive control and logic circuit (LDCL) for thermally printing from one or more donor elements onto a receiver element such as a slide transparency or photographic print. The electronic LDCL circuit is uniquely configured to be able to drive the laser over a wide range of frequencies which print data "words" whose weighted digital values correspond to the pixels of a master image. The LDCL circuit, in executing each "word" for a pixel immediately drives a laser from a threshold near-on value to an optimum "full-on" value, and then leaves the laser full-on for a time corresponding to the weighted digital value of that respective binary word. By way of example, for a word of eight bits there are 256 different levels of values. A tone scale divided into such a number of discreet values appears visually to be substantially continuous. The full-on power level of the laser is set at an optimum operating point above the level at which dye is transferred from a donor element and prints as dye pixels on the receiver element. There is a substantially linear relation between the density of each printed dye pixel on the receiver element and the weighted digital value of the respective data word which drives the laser control circuit. Moreover, the substantially linear relation is still present even though there otherwise may be minor variations in the thermal characteristics of the dye over the surface area of a donor element, or from one donor element to another, or minor variations from one laser to another. In that system, the laser drive and control logic circuit (LDCL) includes means for turning laser full-on to an optimum power level for a time determined by high speed picture data in the form of the binary words. An asynchronous load counter in the LDCL is loaded with each picture data binary word and then, under control of a high speed clock, "counts" during an interval of time the weighted value of the binary word. This count interval determines the time-on of the laser. A count divider in the LDCL determines the loading of each binary word into the counter and turns on a drive unit which powers the laser. The drive unit is turned off by the counter at the end of the count interval. This method of controlling the operation of the laser is called pulse width modulation (PWM). While PWM has been found to provide the advantages noted in the referenced co-pending application, it has been found that the productivity of a system using PWM can be significantly improved according to the present invention. This results from the fact that many images, or portions of images, to be generated by printers utilizing PWM do not require that any of the pixels be exposed for the maximum time possible, but that a maximum exposure can be determined for a selected portion of the image, whether it is for a line, for a paragraph, or for a selected color, that can then be used to speed up the printing of that portion of the image.

SUMMARY OF THE INVENTION

Thus, in accordance with one aspect of the present invention, a printing apparatus is provided which comprises means for producing light spots, scanning means for scanning the light spots along a line at a selected scanning speed, and positioning means for positioning a recording element sensitive to the light spots to be scanned by the light spots and exposing the recording element thereby. Means is provided for supplying an image bearing information signal comprising a plurality of print data words to means for successively storing the print data words and for determining intervals of time corresponding to the respective weighted value of each data word. Control and drive means is provided for turning the light spot producing means on to an optimum full-on power level above the level at which the recording element is exposed, with means for controlling the turning on and off of the control and drive means such that the light spot producing means is full-on for time intervals linearly related to the weighted values of the data words. Means is provided for determining the maximum time interval for each of the data words in a preselected portion of the data words. Means is provided for determining a scanning speed with said maximum time intervals as a selected maximum duty cycle which then operates the scanning means at the determined scanning speed with the preselected portion of the data words.

In accordance with another aspect of the present invention, a method of operating a thermal printing apparatus is provided wherein the apparatus comprises a laser for producing light spots, scanning means for scanning light spots along a line at a selected scanning speed, and positioning means for positioning a dye donor element and a closely adjacent receiver element to be scanned by the laser light spots. The dye donor element has a thermal power level sensitivity above which the dye is transferred to print as dye pixels on the receiver element. The method comprises the steps of: supplying an image bearing information signal comprising a plurality of print data words and successively storing print data words and determining intervals of time corresponding to the respective weighted value of each data word. Turning the laser on to an optimum full-on power level above the level at which dye of a donor element transfers and turning the laser off. Controlling the turning on and off of the laser such that the laser is full-on for time intervals linearly related to the weighted values of the data words. Determining the maximum time interval for each of the data words in a preselected portion of the data words. Determining a scanning speed with the maximum time intervals as a selected maximum duty cycle, and operating the scanning means at the determined scanning speed.

DETAILED DESCRIPTION OF A PREFERRED EMBODIMENT

Figure 1:
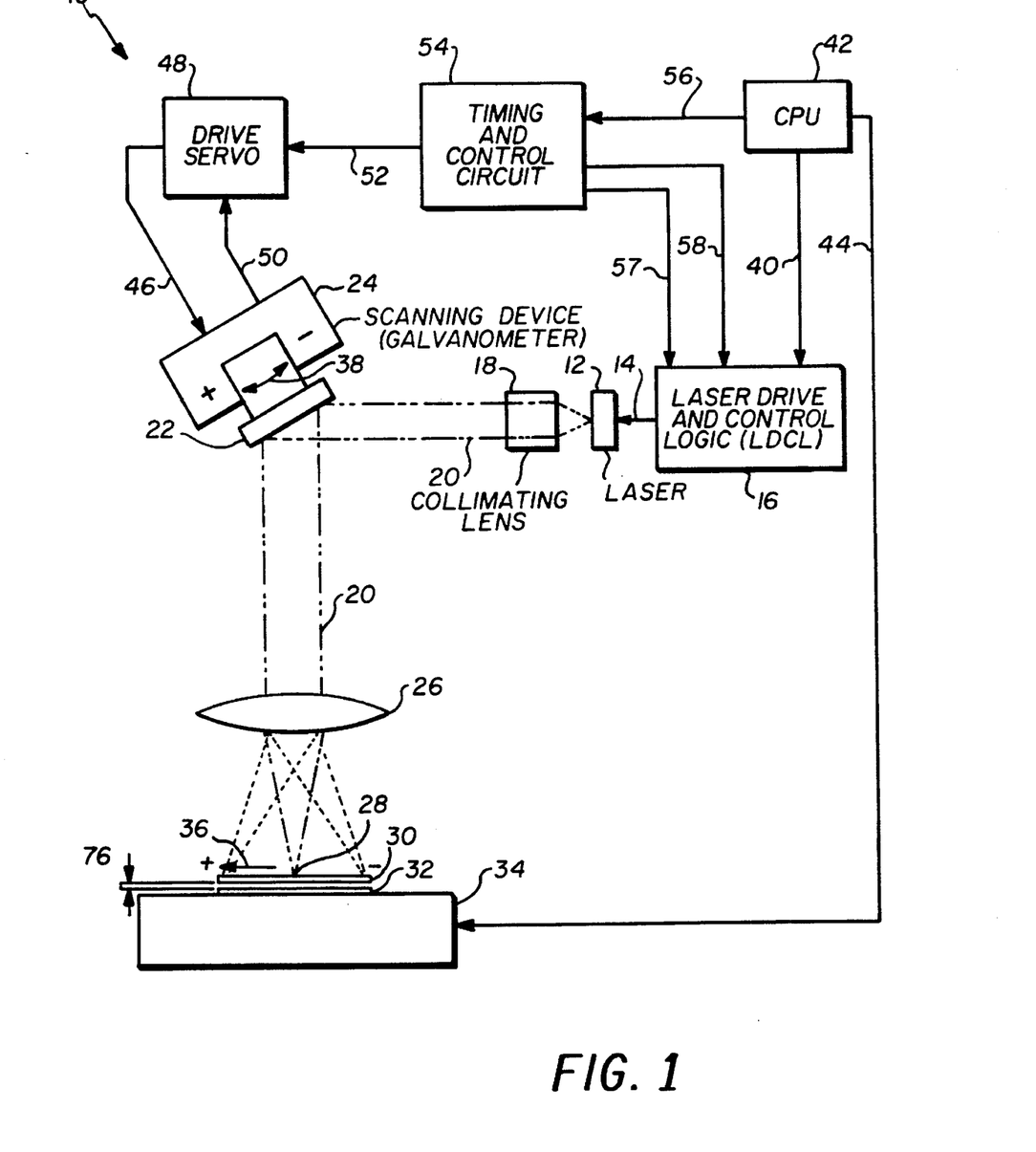
FIG. 1 is a schematic diagram of a thermal dye-transfer laser printer system embodying features in accordance with the invention.

Referring now to FIG. 1, there is shown in schematic form a laser printing system 10 in which the present invention has utility. System 10 comprises a laser 12 which is energized via a lead 14 by a laser drive and control logic (LDCL) circuit 16. The LDCL circuit 16 is described in detail in my above-identified patent. Light emitted from laser 12 is directed to a collimating lens 18 which forms a light beam 20, indicated by the parallel dashed lines. Light beam 20 impinges on a reflecting mirror 22 whose exact angular position is electronically controlled by a scanning device 24. Light beam 20, after reflecting from mirror 22, passes through a f-Θ lens 26 which focuses the beam 20 to a very small spot 28 imaged on a dye donor element 30. Positioned closely beneath donor element 30 is a receiver element, for example a slide transparency, 32 onto which the image is to be printed. The donor and receiver elements 30 and 32 are held together and precisely located under light spot 28 by a positioning mechanism 34. The focused light spot 28, which may be only about 6 microns wide, is scanned linearly, a line at a time, across donor element 30, as indicated by the arrowed line 36, when the device mirror 22 is rotated about its axis, as indicated by the dual-arrow curved line 38 from a minus (−) to a (+) position. Print data, in the form of binary words to be printed as pixels on print element 32, is fed via a buss 40 into the LDCL circuit 16 from a central processing unit (CPU) 42 and modulates light beam 20 as it is linearly and synchronously scanned across the donor and receiver elements 30 and 32. CPU 42 is coupled to and controls the positioning mechanism 34 via a control lead 44. Mechanism 34 shifts the donor and receiver elements 30 and 32 sideways relative to the laser spot 28 to the next line position before the beginning of each line scan, and so on.

The scanning device 24, shown here in a rest or center position, is adapted to rotate plus and minus from center by a certain angular deflection, for example ±7.8°. In swinging from negative to positive deflection, the mirror 22 deflects the light beam 20, and its focused spot 28, and linearly scans it along a line. When it is desired to print at a high resolution (e.g., 4000 pixels per inch or more), it is necessary that the scan or travel of the light spot 28 along the donor element 30, in the direction of the arrow 36, to be extremely linear, very fast, and accurate to an exceptionally high degree.

The scanning device 24, is driven by a power signal via a lead 46 from a drive servo 48. A linearizing feedback signal from the device 24 is applied via a lead 50 to the drive servo 48. The drive servo 48 is controlled by a command waveform applied to it via a lead 52 from a timing and control circuit 54. The circuit 54 in turn receives signals via a signal cable 56 from the CPU 42. The timing and control circuit 54 applies clock signals via a lead 57, and applies line start signals via a lead 58 to the LDCL circuit 16. A laser printing system, similar to the laser printing system 10, with the exception of the LDCL circuit 16, is described in detail in U.S. patent application Ser. No. 722,753, filed Jun. 28, 1991, in the names of J. M. Kresock et al and assigned to the same assignee of the present patent application.

Figure 2:
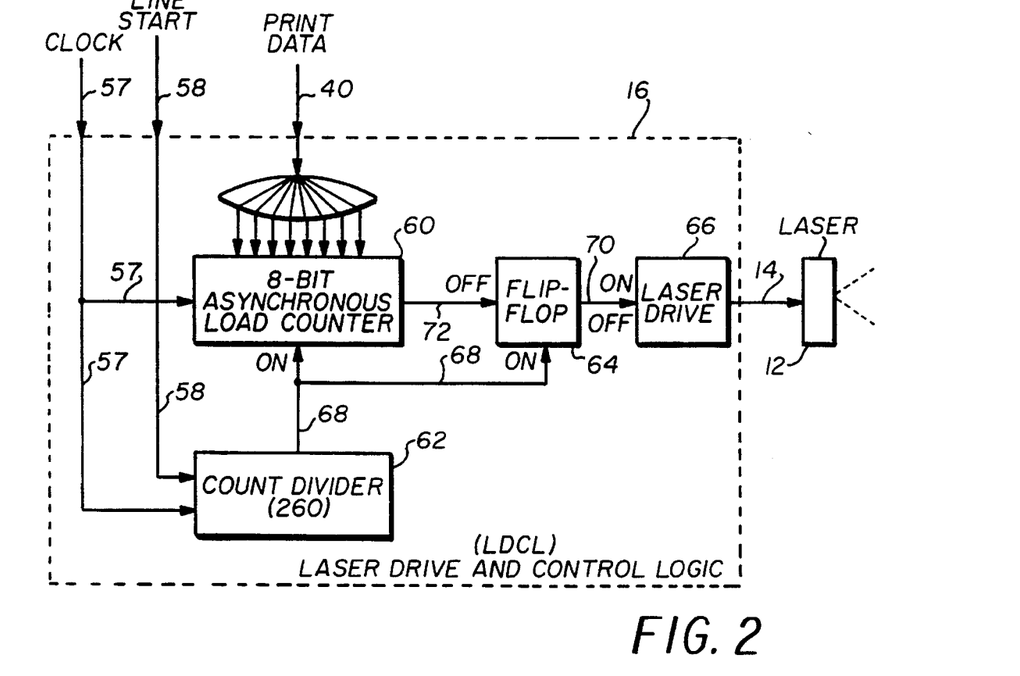
FIG. 2 is a block diagram of an electrical circuit used in the laser system of FIG. 1 and provided according to a preferred embodiment of the invention.

Referring now to FIG. 2, a block diagram of the LDCL circuit 16 is shown within a dashed line rectangle and comprises an asynchronous load counter 60, a count divider 62, a flip-flop 64 and a laser drive 66. The laser drive 66 is connected via the lead 14 to the laser 12 (see also FIG. 1), and this controls the laser 12. High frequency master clock signals are supplied to the LDCL circuit 16 via the lead 57 (see also FIG. 1). These clock signals are applied both to the counter 60 and the count divider 62. Line start signals via the lead 58 are applied to the LDCL 16 and the count divider 62 in order to synchronize the printing action of the laser 12 with the beginning of the scanning of the focused light spot 28 as it sweeps along a line on the donor element 30 (see FIG. 1) from a starting or minus position to an ending or plus position as indicated by the arrow 36. Print data, in the form of 8-bit words is applied to the LDCL circuit 16 and to the asynchronous load counter 60 from the CPU 42 via the buss 40.

The count divider 62 counts down or divides the high frequency clock by a suitable amount. For example, the count divider 62 may be set to divide by "260". Thus for 260 clock counts, the count divider 62 produces a single count, termed a pixel clock count. By way of example, for a high speed clock frequency of 36 MHz, dividing by 260 gives a pixel clock of about 140 KHz (138.46 KHz). The pixel clock signals or counts, which are synchronized with the line start signal as previously explained, are applied via a lead 68 to the asynchronous load counter 60 and to the flip-flop (on-off switch) 64. For an 8-bit word of 256 numbers, the count of 260 provides several extra clock intervals, termed "overhead" counts, to compensate for minute delays in the actuation of various elements in the LDCL circuit 16. It is desirable to provide at least one extra count to take care of system "overhead".

A pixel clock signal from the count divider 62 actuates the asynchronous load counter 60 to load into it each 8-bit picture data word. Then on a subsequent clock count, the asynchronous load counter 60 begins a time cycle during which it counts down from the weighted value of the print data word (a decimal number between 255 and 0) to "0". One "overhead" clock count as described above takes care of the starting of the counter 60. The number of high speed clock counts represented by a given binary word determines the "time-on" duration for the laser 12.

Along with the actuation of the asynchronous load counter 60 by a pixel clock count, that same pixel clock count is applied via the lead 68 to the flip-flop 64. This selectively turns the flip-flop 64 "on" and it, via a lead 70, turns on the laser drive 66. The laser drive 66 is set at an optimum, near full power level of the laser 12; so long as the flip-flop is "on", the laser is energized at this optimum power level. When "off" the laser drive 66 holds the laser 12 at its threshold turn-on power level. Because the laser, when "on", is at constant (optimum) power, there is no non-linearity in power level and no variation (astigmatism) in the focused light spot 28 due to such non-linearity. This also means that uncontrollable variations in performance from one printer system 10 to another supposedly identical one are obviated. This is an important manufacturing consideration.

The output of asynchronous load counter 60 is connected via a lead 72 to the flip-flop 70. When the counter in counting the binary word then stored in it reaches "0", the counter 60 applies to the lead 72 an "off" signal which turns off the flip-flop 64, and in turn the laser drive 66. On the occurrence of the next pixel clock count the next print data word is loaded into the asynchronous load counter 60, the flip-flop 64 is turned "on", and then the counter 60 again counts down to "0". Because the counter 60 is asynchronously loaded, it is fully loaded with a print data word before a succeeding high speed clock count starts it counting down to "0". Because the asynchronous load counter 60 does not have to be synchronized with a particular clock count, this arrangement permits the LDCL circuit 16 to operate over a wide range of high speed clock frequencies, for example over a range from 20 MHz to 80 MHz. Thus greater flexibility in the operation of the laser printer system 10 is made possible while maintaining improved linearity in the tone scale of the images printed.

Figure 3:
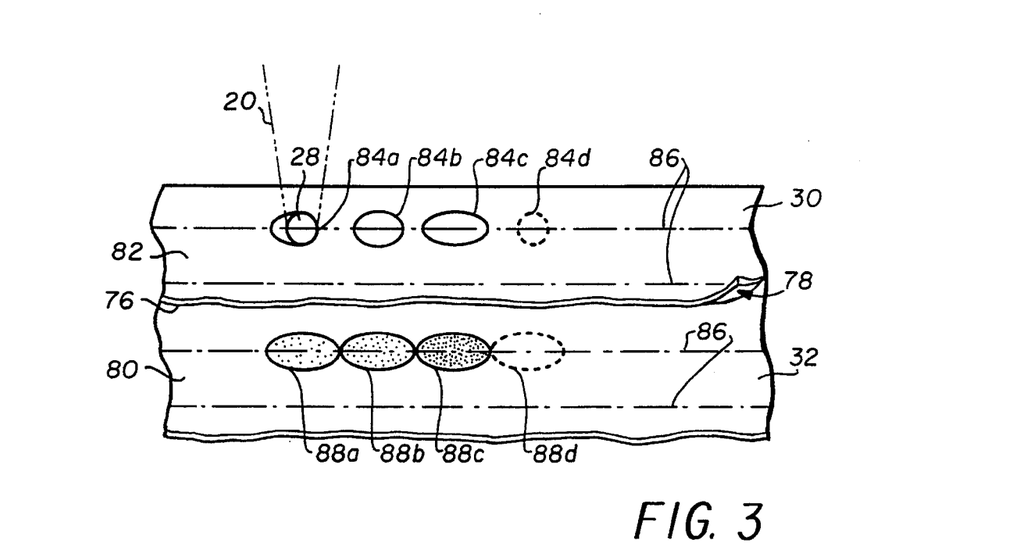
FIG. 3 is a greatly enlarged, partially broken away portion of a dye donor element and a closely adjacent receiver element showing schematically how thermal energy of a laser transfers pixels of dye from the donor to the receiver element.

Referring now to FIG. 3 there is shown greatly enlarged, and partially broken away top view, portions of the dye donor element 30 and the receiver element 32 positioned closely beneath it. The dye donor element 30 is advantageously a thin sheet of plastic, such as tensilized polyester, having a surface coated with a thin layer of a dye material which is thermally reactive and which transfers when heated sufficiently. The receiving element 32 is advantageously a thin piece of plastic such as polycarbonate, having a smooth flat surface on which microscopically small dye pixels can be printed to form a high definition image. A dye donor element and an image receiving element such as these are described in U.S. Pat. No. 4,833,124. The two elements 30 and 32 are advantageously separated by a very small distance 76 which for example, is about 8 microns (also see distance 76 in FIG. 1). A dye coated surface 78 of the donor element 30 faces down toward an image receiving surface 80 of the receiver element 32. The two elements 30 and 32 may be held separated, for example by very small beads (e.g. 8 microns dia.) randomly spaced on dye surface 78. The donor element 30 has a top surface 82 which is scanned by the finely focused light spot 28 of the laser beam 20. A series of heat spots 84a through 84c (not to scale) caused by the sequentially imaged and scanned laser-beam 20 are here schematically shown as elongated or oval and as discrete areas lying along one of the laser scanning lines indicated by the dashed lines 86. The laser beam 28 is being turned on and off at high speed as it is being scanned along a line 86. Thus, even though the focused light spot 28 may be approximately round, its thermal footprint, illustrated by the heat spots 84a through 84c is elongated. What would be a heat spot 84d is shown in dashed outline because, as will be explained, the laser is not turned on at this spot. The dashed lines 86 lie side-by-side, closely adjacent to each other on a fine pitch as determined by the positioning mechanism 34. As thermal energy is applied to each heat spot 84(a,b,c), a greater or lesser amount of a spot of the dye is transferred from the surface 78 of the donor element 30 depending on the amount of energy applied to a given spot. The dye spot so transferred from surface 78 is transferred as a dye pixel onto the image surface 80 of the receiver element 32. For the sake of simplicity, only four dye pixels are shown (not to scale) as 88a, 88b, 88c and 88d (dye donor element 30 is shown broken away here so as to expose these particular pixels). It is understood that the heat spots (similar to the heat spots 84a–d) which are used to generate these pixels are part of the donor element 30 which has been broken away. The dye pixels 88a, 88b, 88c and 88d are shown as touching and are slightly larger than their corresponding heat spots because of the transfer of the dye and because of a slight spreading out of the thermal energy of a heat spot as this energy is transmitted through the donor element 30 and applied to the dye on its lower surface 78.

Figure 4:
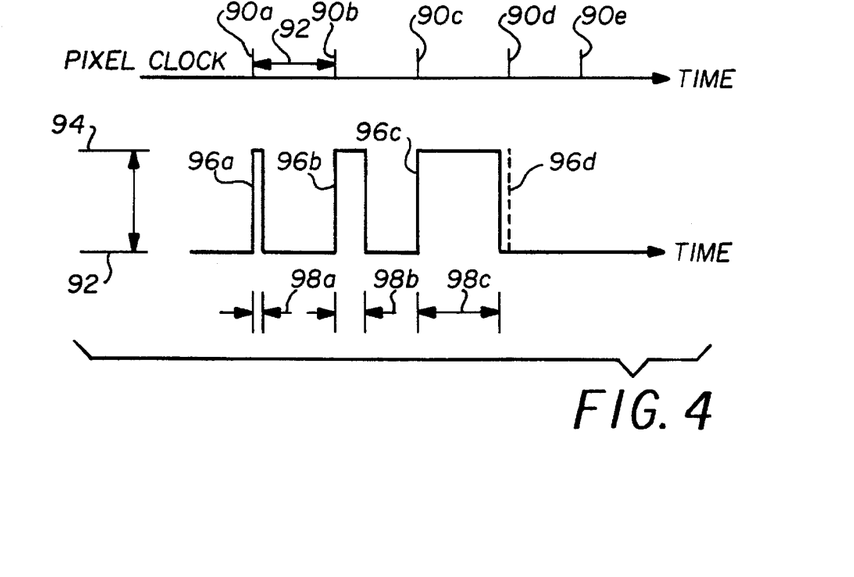
FIG. 4 shows how in accordance with the invention the laser energy is controlled to obtain substantially linear density or tone scale in the dye pixels printed on the receiver element.

Referring now to FIG. 4, there are shown a series of pixel clock counts 90a through 90e having a time spacing or period indicated by the arrow 92. As was explained above, the count divider 62 (see FIG. 2) determines the number of high speed clock counts during each period 92 (e.g., 260). Each pixel count period 92 determines the "length" of a dye pixel 88a, 88b, 88c, or 88d (see FIG. 3). Thus dye pixel 88a nominally begins at the pixel count 90a and ends at the pixel count 90b, and so on. There is also shown in FIG. 4 the relation of the pixel counts 90a through 90e to the times during which the laser beam 20 is turned on and off. The power applied to the laser 12 is shown in FIG. 4 as being either at a threshold turn-on level indicated at 92, or at a power-on optimum level indicated at 94. When pixel count 90a occurs, if by way of example the weighted value of the binary word then stored in asynchronous load counter 60 is near "0", the counter 60 runs for only a short time and then turns the laser 12 off. Because of the thermal time constant of the donor element 30, there is a threshold time (e.g., about 1.3 microsecond) that the laser 12 must be on before dye begins to ablate from the surface 78 of the donor element 30. Such a condition is illustrated by the narrow pulse 96a having a duration shown as 98a (slightly longer than the threshold time). This produces a dye pixel of near minimum density as illustrated by the lightly shaded dye pixel 88a in FIG. 3. If on the next pixel count 90b in FIG. 4 the binary word is larger, resulting in a longer count duration, the laser 12 is turned on for a longer time, illustrated by the wider pulse 96b, whose duration is shown as 98b. The corresponding dye pixel 88b has a proportionally higher density, indicated by heavier shading. Similarly, for a near maximum count duration illustrated by the still wider pulse 96c, with a duration shown as 98c, the dye pixel 88c has near maximum density as indicated. If at a pixel count $90d$, the print data word count is "0", the laser 12 is not turned on at all (indicated by the dashed line $96d$) and the corresponding dye pixel $88d$ has a "0" density (no shading) and is shown in dashed outline. The absence of a corresponding heat spot is indicated by the dashed outline of the spot $84d$ in FIG. 3.

Figure 5:
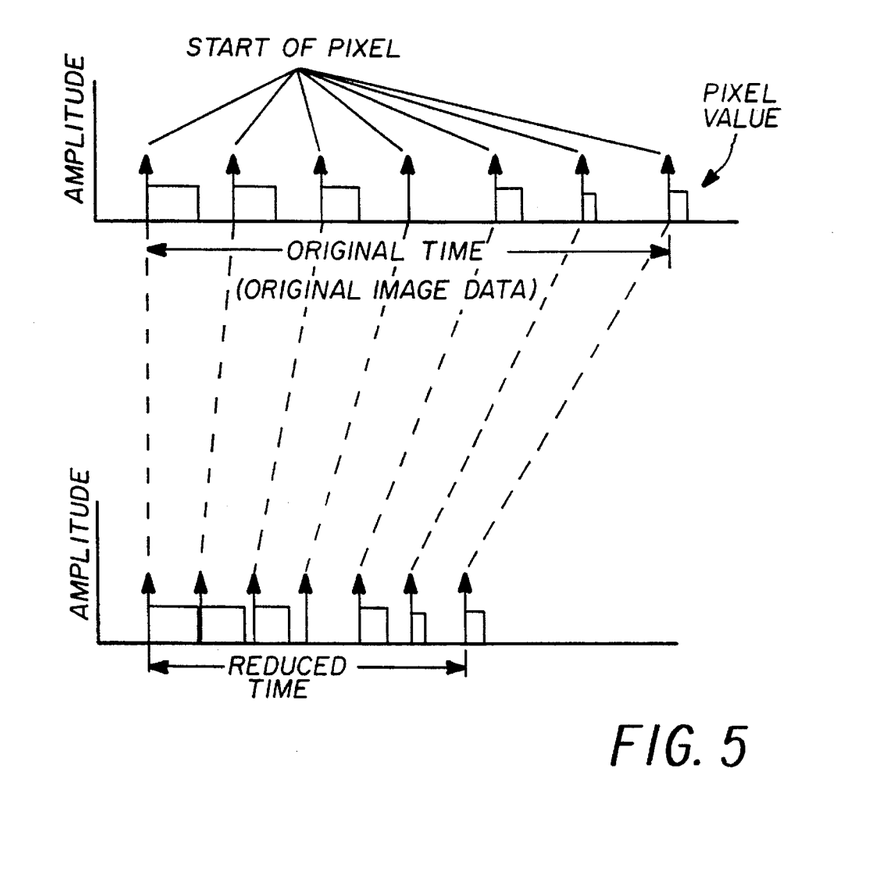
FIG. 5 is a graphic illustration showing how the productivity of the apparatus is improved by the present invention.

Referring now to FIG. 5, a graphic illustration is presented of how the productivity of the PWM printing apparatus is improved by the present invention. When the apparatus is operated according to the prior art, the image pixel information is provided to the apparatus and, as described with respect to FIG. 4, results in pixel counts that are some percentage of the maximum pixel count provided by the pixel clock. As described above, if the maximum pixel density is called for by the image bearing information signal, in a 256 bit system, then the LDCL will activate the laser for the maximum time permitted by the pixel clock. However, it is known that not all images contain maximum density pixels, or at most only a portion of the pixels must be written at maximum density, and those sometimes only in a portion of the image. As a result, the overall productivity of the printer operated by PWM of the prior art is limited by the maximum pixel time necessary to produce a small portion of the image pixels unnecessarily limiting the speed at which the remaining, less than maximum density pixels can be written. Thus, the upper portion of FIG. 5 illustrates the original time required to write seven pixels (where one pixel has no density) according to PWM of the prior art. As illustrated, no pixel in the portion of the image represented needs to be printed with a maximum density; each pixel thus employs only a portion of the time allotted by the pixel clock so that there is a significant amount of "dead" time. For example, if an image to be written is found to have a color plane wherein the maximum pixel value is only 128, then the laser will be utilized with only a 50% duty cycle (128/256= 0.5) to produce the desired density for that color. Therefore, the laser will be "on" for a maximum of one-half of the available pixel clock time. The other 50% of the pixel clock time will be "dead time". However, according to the present invention, the writing speed of the printing system can be increased, in this example by 100%, so that the laser can be "on" for 100% of the pixel clock time while producing the desired maximum pixel density value of 128. The writing time for this color plane would then be one-half of that required for PWM writing with the prior art. Of course, if the maximum pixel value for a given portion of the image is 256, then no savings in time would occur. In the lower portion of FIG. 5, the maximum pixel length in the selected portion of pixel words occurs in the first pixel. Thus, the maximum pixel clock time is set to that length for that set of pixel words. In the illustrated example, the time savings would be approximately 40%.

Since the present invention can be used for any selected portion of an image, e. g. color plane, line, paragraph, or page, there will usually be some significant time savings in utilizing the present invention. It would even be possible to utilize the present invention for each word in a line if the scanning means is capable of sufficiently rapid scan rate changes to adapt to the changes necessary. Even if this were not possible, it has been found that most images have sufficient portions with these lower density requirements to make the time savings provided by the present invention advantageous.

Figure 6:
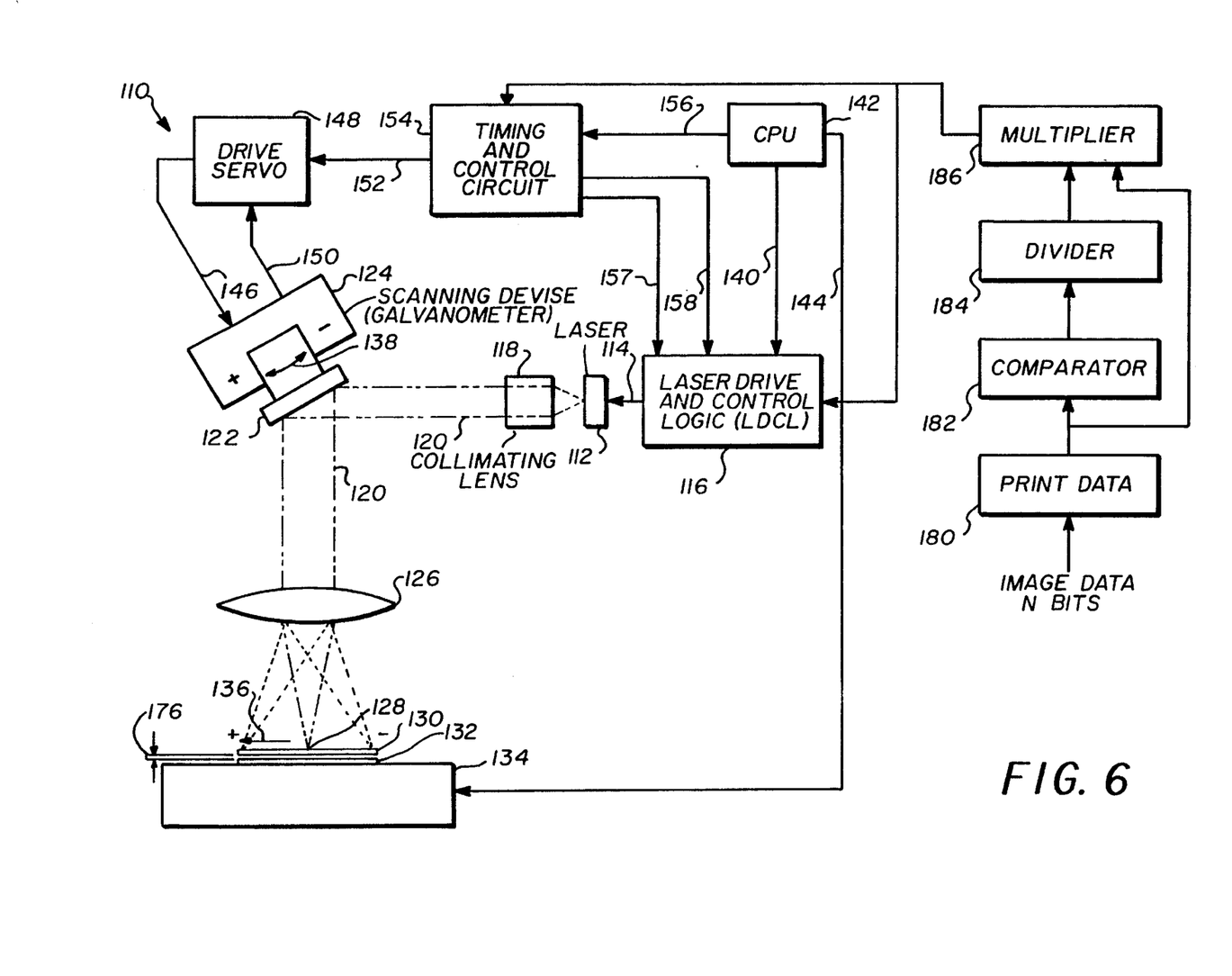
FIG. 6 is a block diagram of an electrical circuit used to improve the productivity of the laser printer system of FIG. 1 according to a preferred embodiment of the invention.

Referring now to FIG. 6, there is shown a printer 110 similar to that shown in FIG. 1 wherein like elements are provided with the same reference numerals with the prefix "1", the image bearing information signal is supplied to a print data word storage means 180. The print data storage means delivers the signal to a comparator 182 which determines the maximum time interval for each of the data words in a selected portion of the data words. The output of the comparator is delivered to a divider 184, the output of which is provided to a multiplier 186 which is also provided with the output of the print data word storage means 180. The multiplier determines the scanning speed with the maximum time interval as a 100% duty cycle or as a selected maximum duty cycle other than 100%. The output of the multiplier is then supplied to the timing and control circuit 154 which controls the drive servo 148 to operate the scanning means at the determined scanning speed. The output of the multiplier is also supplied to the laser drive and control logic 116 to turn the laser on and off in accordance with the time intervals determined by the print data and the selected maximum duty cycle. It will be appreciated that while a selected maximum duty cycle of 100% will provide the maximum time saving for a printer, other maximum duty cycles of less than 100%, such as 95% or 98%, or any other maximum, may be preferred in different systems having differing operating parameters.

It is to be understood that the embodiments of apparatus and method described herein are illustrative of the general principles of the invention. Modifications may readily be devised by those skilled in the art without departing from the spirit and scope of the invention. For example, different sizes and pitches of dye pixels, and different pitches of scan lines may be used. The full-on power of laser 12 may be changed to a different optimum level depending on a particular dye donor element 30. The print digital data is not limited to a binary word or to 8-bits, nor the count divider limited to dividing by "260". Still further, the power-on durations of the laser may be linearly related to the print data by circuitry other than that specifically shown.

The invention has been described with reference to specific preferred embodiments and variations thereof, but it will be understood that other variations and modifications can be effected within the spirit and scope of the invention, which is defined by the following claims.

| | Parts List |
|---|---|
| 10, 110 | Laser Printing System |
| 12, 112 | Laser |
| 14, 114 | Lead |
| 16, 116 | Laser Drive and Control Circuit (LDCL) |
| 18, 118 | Collimating Lens |
| 20, 120 | Light Beam |
| 22, 122 | Reflecting Mirror |
| 24, 124 | Scanning Device |
| 26, 126 | f-49 Lens |
| 28, 128 | Light Spot |
| 30, 130 | Dye Donor Element |
| 32, 132 | Receiver Element (Slide Transparency) |
| 34, 134 | Positioning Mechanism |
| 36, 136 | Arrow |
| 38, 138 | Curved Arrow |
| 40, 140 | Buss |
| 42, 142 | CPU |
| 44, 144 | Control Lead |
| 46, 146 | Lead |
| 48, 148 | Drive Servo |
| 50, 150 | Lead |
| 52, 152 | Lead |
| 54, 154 | Circuit |
| 56, 156 | Signal Cable |
| 57, 157 | Lead |
| 58, 158 | Lead |

-continued

Parts List

| | |
|---|---|
| | Asynchronous Load Counter |
| | Count Divider |
| | Flip-flop |
| | Laser Drive |
| | Lead |
| 70 | Lead |
| 72 | Lead |
| 76, 176 | Distance |
| 78 | Dye Coated Surface |
| 80 | Image Receiving Surface |
| 82 | Top Surface (donor element) |
| 84a–84c | Light Spot |
| 86 | Scanning Lines |
| 88a–88d | Dye Pixels |
| 90a–90e | Pixel Clock Counts |
| 92 | Pixel Count Period |
| 94 | Optimum Power-on Level |
| 96a–96d | Laser Pulse |
| 98a–98c | Pulse Width Duration |
| 180 | Print Data Word Storage Means |
| 182 | Comparator |
| 184 | Divider |
| 186 | Multiplier |

What is claimed is:

1. Printing apparatus comprising:

means for producing light spots;

scanning means for scanning said light spots along a line at a selected scanning speed;

positioning means for positioning a recording element sensitive to said light spots to be scanned by the light spots and exposing said recording element thereby;

means for supplying an image bearing information signal comprising a plurality of print data words;

means for successively storing print data words and for determining intervals of time corresponding to a respective weighted value of each data word, said respective weighted value being determined by a processor; and control and &five means for turning the light spot producing means on to an optimum full-on power level above the level at which said recording element is exposed, means for controlling the turning on and off of the control and drive means such that the light spot producing means is full-on for time intervals linearly related to the weighted values of the data words;

means for determining a time interval for each of said data words in a preselected portion of said data words and selecting from said time intervals a maximum time interval;

means for determining a scanning speed, said scanning speed being equal to a distance containing said preselected portion of said data words; divided by the number of data words in said preselected portion times the maximum time interval; and means for operating said scanning means at the determined scanning speed.

2. Printing apparatus according to claim 1 wherein said selected maximum duty cycle is a 100% duty cycle.

3. Thermal printing apparatus comprising:

a laser for producing light spots;

scanning means for scanning light spots along a line at a selected scanning speed;

positioning means for positioning a dye donor element and a closely adjacent receiver element to be scanned by the laser light spots, the dye donor element having a thermal power level sensitivity above which the dye is transferred to print as dye pixels on the receiver element;

means for supplying an image bearing information signal comprising a plurality of print data words;

means for successively storing print data words and for determining intervals of time corresponding to a respective weighted value of each data word, said respective weighted value being determined by a processor; and laser control and drive means for turning the laser on to an optimum full-on power level above the level at which dye of a donor element transfers, means for controlling the turning on and off of the laser control and drive means such that the laser is full-on for time intervals linearly related to the weighted values of the data words;

means for determining a time interval for each of said data words in a preselected portion of said data words and selecting from said time intervals a maximum time interval;

means for determining a scanning speed with said maximum time intervals as a selected maximum duty cycle; and means for operating said scanning means at the determined scanning speed.

4. Thermal printing apparatus according to claim 3 wherein said selected duty cycle is a 100% duty cycle.

5. The method of operating a printing apparatus comprising means for producing light spots, scanning means for scanning said light spots along a line at a selected scanning speed, and positioning means for positioning a recording element sensitive to said light spots to be scanned by the light spots and exposing said recording element thereby; the method comprising the steps of:

supplying an image bearing information signal comprising a plurality of print data words;

successively storing print data words and determining intervals of time corresponding to a respective weighted value of each data word, said respective weighted value being determined by a processor;

turning the light spot producing means on to an optimum full-on power level above the level at which said recording element is exposed and turning the spot producing means off, controlling the turning on and off of the light spot producing means so that the light producing means is full-on for time intervals linearly related to the weighted values of the data words;

determining a time interval for each of said data words in a preselected portion of said data words and selecting from said time intervals a maximum time interval;

determining a scanning speed, said scanning speed being equal to a distance containing said preselected portion of said data words; divided by the number of data words in said preselected portion times the maximum time interval; and operating said scanning means at the determined scanning speed.

6. The method of operating a printing apparatus according to claim 5 wherein said selected maximum duty cycle is a 100% duty cycle.

7. The method of operating a thermal printing apparatus comprising a laser for producing light spots, scanning means for scanning light spots along a line at a selected scanning speed, and positioning means for positioning a dye donor element and a closely adjacent receiver element to be scanned by the laser light spots, the dye donor element having a thermal power level sensitivity above which the dye is transferred to print as dye pixels on the receiver element; the method comprising the steps of:

supplying an image bearing information signal comprising a plurality of print data words;

successively storing print data words and determining intervals of time corresponding to a respective weighted value of each data word, said respective weighted value being determined by a processor;

turning the laser on to an optimum full-on power level above the level at which dye of a donor element transfers and turning the laser off, controlling the turning on and off of the laser such that the laser is full-on for time intervals linearly related to the weighted values of the data words;

determining a time interval for each of said data words in a preselected portion of said data words and selecting from said time intervals a maximum time interval;

determining a scanning speed, said scanning speed being equal to a distance containing said preselected portion of said data words; divided by the number of data words in said preselected portion times the maximum time interval; and operating said scanning means at the determined scanning speed.

8. The method of operating a thermal printing apparatus according to claim 7 wherein said selected maximum duty cycle is a 100% duty cycle.

* * * * *